US012576710B2

(12) United States Patent (10) Patent No.: US 12,576,710 B2
Kadari Subbarao et al. (45) Date of Patent: Mar. 17, 2026

(54) TRUCK CABIN

(71) Applicant: Volvo Truck Corporation, Gothenburg (SE)

(72) Inventors: Sudeendra Thirtha Koushik Kadari Subbarao, Bangalore (IN); Madhuchandra Koogenahalli Sadashivaiah, Bangalore (IN)

(73) Assignee: Volvo Truck Corporation, Gothenburg (SE)

( * ) Notice: Subject to any disclaimer, the term of this patent is extended or adjusted under 35 U.S.C. 154(b) by 306 days.

(21) Appl. No.: 18/350,184

(22) Filed: Jul. 11, 2023

(65) Prior Publication Data

US 2024/0025255 A1 Jan. 25, 2024

(30) Foreign Application Priority Data

Jul. 18, 2022 (EP) ..................................... 22185527

(51) Int. Cl.
| | |
|---|---|
| *B60K 35/00* | (2024.01) |
| *B60K 35/23* | (2024.01) |
| *B60K 35/60* | (2024.01) |
| *B60K 35/28* | (2024.01) |

(52) U.S. Cl.
CPC .............. *B60K 35/00* (2013.01); *B60K 35/23* (2024.01); *B60K 35/28* (2024.01); *B60K 35/60* (2024.01); *B60K 2360/167* (2024.01); *B60K 2360/334* (2024.01); *B60K 2360/782* (2024.01)

(58) Field of Classification Search
CPC ........ B60K 2360/167; B60K 2360/334; B60K 2360/771; B60K 2360/782; B60K 35/00; B60K 35/22; B60K 35/23; B60K 35/28; B60K 35/53; B60K 35/60; B60K 35/654; B60Y 2200/14

See application file for complete search history.

(56) References Cited

FOREIGN PATENT DOCUMENTS

| | | | |
|---|---|---|---|
| CN | 109955791 A | 7/2019 | |
| DE | 102015012626 A1 * | 4/2017 | ............. B60K 35/60 |
| FR | 2814420 B1 | 12/2002 | |
| JP | H02197429 A * | 8/1990 | |
| KR | 20050023140 A | 3/2005 | |
| KR | 20130080915 A | 7/2013 | |

OTHER PUBLICATIONS

European Search Report for European Patent Application No. 22185527, completed Dec. 12, 2022, 2 pages.

* cited by examiner

*Primary Examiner* — Charles J Han
(74) *Attorney, Agent, or Firm* — Withrow & Terranova, PLLC

(57) ABSTRACT

A truck cabin for a truck, comprising a windshield, a driver's seat, a steering wheel, a dashboard and a projector projecting an image onto the steering wheel. To improve the driver's visibility in front of the truck cabin, the image projected by the projector onto the steering wheel is configured to comprise information about the operation of the truck. In a first direction of sight of a driver sitting in the driver's seat and looking at the steering wheel, the dashboard does not comprise any other information displays about the operation of the truck.

10 Claims, 3 Drawing Sheets

TRUCK CABIN

RELATED APPLICATIONS

The present application claims priority to European Patent Application No. 22185527.3, filed on Jul. 18, 2022, and entitled "TRUCK CABIN," which is incorporated herein by reference in its entirety.

TECHNICAL FIELD

The disclosure relates generally to heavy-duty vehicles. In particular aspects, the disclosure relates to a truck cabin.

The disclosure can be applied in heavy-duty vehicles, such as trucks, buses, and construction equipment. Although the disclosure will be described with respect to a particular vehicle, the disclosure is not restricted to any particular vehicle.

BACKGROUND

In heavy-duty vehicles, such as trucks, it is known to equip the dashboard of a truck cabin with several information displays providing information about the operation of the truck, such as, usually, truck speed, fuel gauge, rotational speed of the motor and/or motor temperature. These information displays are usually gauges and/or a digital screen. To allow a truck driver to see these information displays without being distracted from the road, these displays are typically located behind the steering wheel, so that they are visible through openings in the steering wheel, or above the steering wheel. In addition, the information displays are located relatively high on the dashboard, so that all truck drivers can see the information displays, even small drivers.

A disadvantage of these displays is that they take up a lot of space, preventing the driver from seeing the lower part of the windshield and thus reducing visibility outside of the truck cabin, creating a blind spot in front of the truck cabin.

It is also known in the automotive field to provide an entertainment system comprising a video system used to project an image onto a steering wheel, the image being used for entertainment purposes, for example for telephone communication or to replicate a smartphone screen.

SUMMARY

The invention aims at reducing the blind spot in front of the truck cabin by reducing the space occupied by the displays.

According to an aspect of the disclosure, the invention concerns a truck cabin for a truck comprising a windshield, a driver's seat, a steering wheel, a dashboard and a projector projecting an image onto the steering wheel. According to the invention, the image projected by the projector onto the steering wheel is configured to comprises information about the operation of the truck, and in a first direction of sight of a driver sitting in the driver's seat and looking at the steering wheel, the dashboard does not comprise any other information displays about the operation of the truck.

Hereby, a technical effect includes lowering the dashboard, which results in an improved visibility in front of the truck cabin, since the windshield is less hidden by the dashboard. Owing to the invention, by using the steering wheel as a projecting surface to project the information about the operation of the truck, the traditional information displays can be removed and the dashboard lowered, thus increasing the visibility in front of the truck cabin.

In certain examples, in a second direction of sight of the driver sitting in the driver's seat and looking above the steering wheel, the dashboard does not comprise any other information displays about the operation of the truck. Hereby, the dashboard can be lowered which results in an increased visibility in front of the truck cabin.

In certain examples, in the second direction of sight, the dashboard is not visible. Hereby, the driver of the truck is able to see a lower part of the windshield.

In certain examples, the driver's seat comprises a base and a backrest and a height measured along a vertical axis of the truck cabin between the base and a lowest visible point of the windshield, in the first direction of sight, is less than or equal to X mm. Hereby, the driver of the truck is able to see a particularly low point of the windshield, further increasing the visibility in front of the truck cabin.

In certain examples, a height measured along a vertical axis of the truck cabin between a lowest visible point of the windshield, in the first direction of sight, and a lowest visible point of the windshield, in a second direction of sight of a driver sitting in the driver's seat and looking above the steering wheel, is greater than or equal to Z mm. Hereby, the driver of the truck is able to see a particularly low point of the windshield, compared to the lowest point visible on an ordinary truck, further increasing the visibility in front of the truck cabin.

In certain examples, the steering wheel comprises a central part on which the image is projected by the projector, an outer ring, spokes connecting the central part to the outer ring and an upper opening delimited by the central part, the outer ring and two spokes, the upper opening being located on an upper half of the steering wheel, and wherein, in the first direction of sight, when a steering angle of the steering wheel is equal to 0°, the windshield is visible through the upper opening. Hereby, by moving his sight a little, the driver can either look at the projected image onto the central part, or at the front of the truck cabin through the upper opening, thus reducing the time needed to switch from one to the other.

In certain examples, in the first direction of sight, the dashboard is not visible through the upper opening. Hereby, the front of the truck cabin is visible through the entire upper opening, further increasing the visibility in front of the truck cabin.

In certain examples, the projector is configured to adapt the image projected onto the steering wheel, depending of a steering angle of the steering wheel. Hereby, the information about the operation of the truck projected onto the steering wheel are visible in an optimized manner, regardless of the steering angle of the steering wheel, improving the reception of information by the driver.

In certain examples, when the steering angle is equal to 0°, the projector projects the image on a first area of the steering wheel, wherein, when the steering angle is equal to 180°, the projector projects the image on a second area of the steering wheel and wherein the second area is a portion of the first area. Hereby, more information about the operation of the truck is displayed when the truck is driving straight, i.e., when the driver is more available to read this information, and less information about the operation of the vehicle is displayed when the truck is maneuvered, i.e., when the driver is less available to read this information, improving the reception of information by the driver.

In certain examples, the projector is mounted on a roof of the truck cabin. Hereby, the projector is easily fixed in the truck cabin, decreasing the cost of the truck cabin.

In certain examples, the information about the operation of the truck projected by the projector onto the steering wheel is selected from a set of information including truck speed, fuel gauge, rotational speed of the motor and/or motor temperature. Hereby, the information projected onto the steering wheel includes the information essential for driving the truck.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical effects and corresponding advantages.

BRIEF DESCRIPTION OF THE DRAWINGS

With reference to the appended drawings, below follows a more detailed description of aspects of the disclosure cited as examples.

DETAILED DESCRIPTION

Aspects set forth below represent the necessary information to enable those skilled in the art to practice the disclosure.

Figure 1:
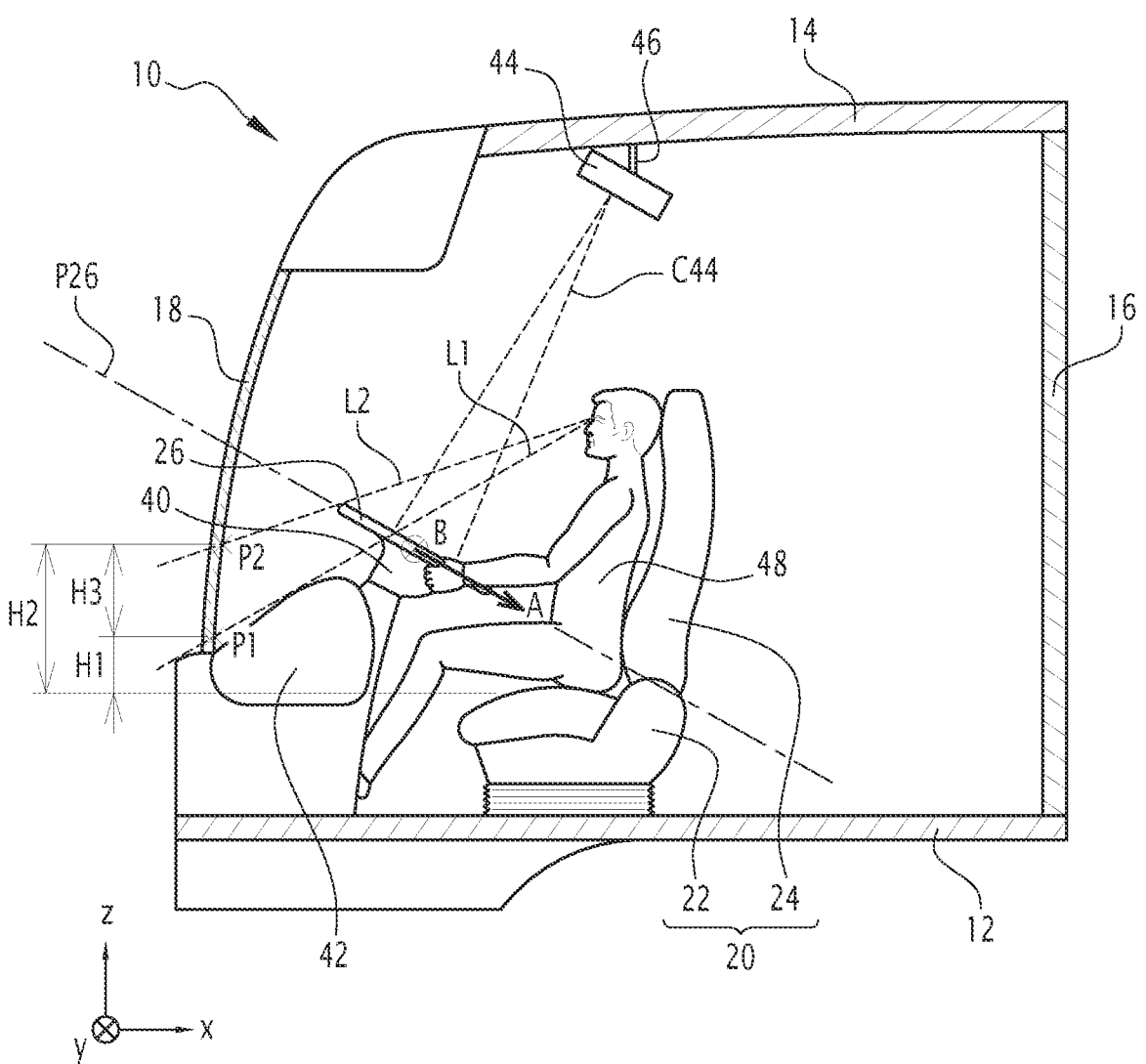
FIG. 1 is a side view of an exemplary truck cabin according to the invention.

An exemplary truck cabin 10 is visible on FIG. 1. The truck cabin 10 comprises a floor 12, a roof 14, a rear wall 16 and a windshield 18.

A vertical axis Z is defined as an axis, vertical when the cabin 10 is mounted on a truck lying on flat ground. In the following description, "vertical", "up", "down", "low" and "above" refer to the vertical axis Z. The floor 12 and the roof 14 are respectively located on a lower side and on an upper side of the truck cabin 10, along the vertical axis Z.

A longitudinal axis X is defined as corresponding to a main axis of the cabin and of a non-represented truck on which the cabin is intended to be installed, i.e., the direction of travel of the truck. In the following description, "front", "back" and "rear" refer to the longitudinal axis X. The windshield 18 and the rear wall 16 are respectively located on a front side and on a rear side of the truck cabin 10, along the longitudinal axis X.

A transversal axis Y is defined as a width axis of the cabin 10, and is perpendicular to the longitudinal and vertical axes X and Z. In the following description, "left" and "right" refer to the transversal axis Y.

The vertical axis Z is perpendicular to the axes X and Y, which are therefore horizontal. In the following description, "horizontal" refers to any element comprised in a plane perpendicular to the axis Z.

The truck cabin 10 also comprises a driver's seat 20, which includes a base 22 and a backrest 24. The base 22 is essentially horizontal, and allows a driver 48 to seat on the driver's seat, and the backrest 24 is essentially vertical, and allows the driver 48 to rest his back when sitting in the driver's seat.

Advantageously, the driver's seat is adjustable in height, i.e., the distance between the base 22 and the floor 12 is adjustable, in particular to adapt to the height of the driver 48. In the following description, it is considered that the seat is raised to the maximum, that is, that the distance between the base and the floor is maximal.

Figure 2:
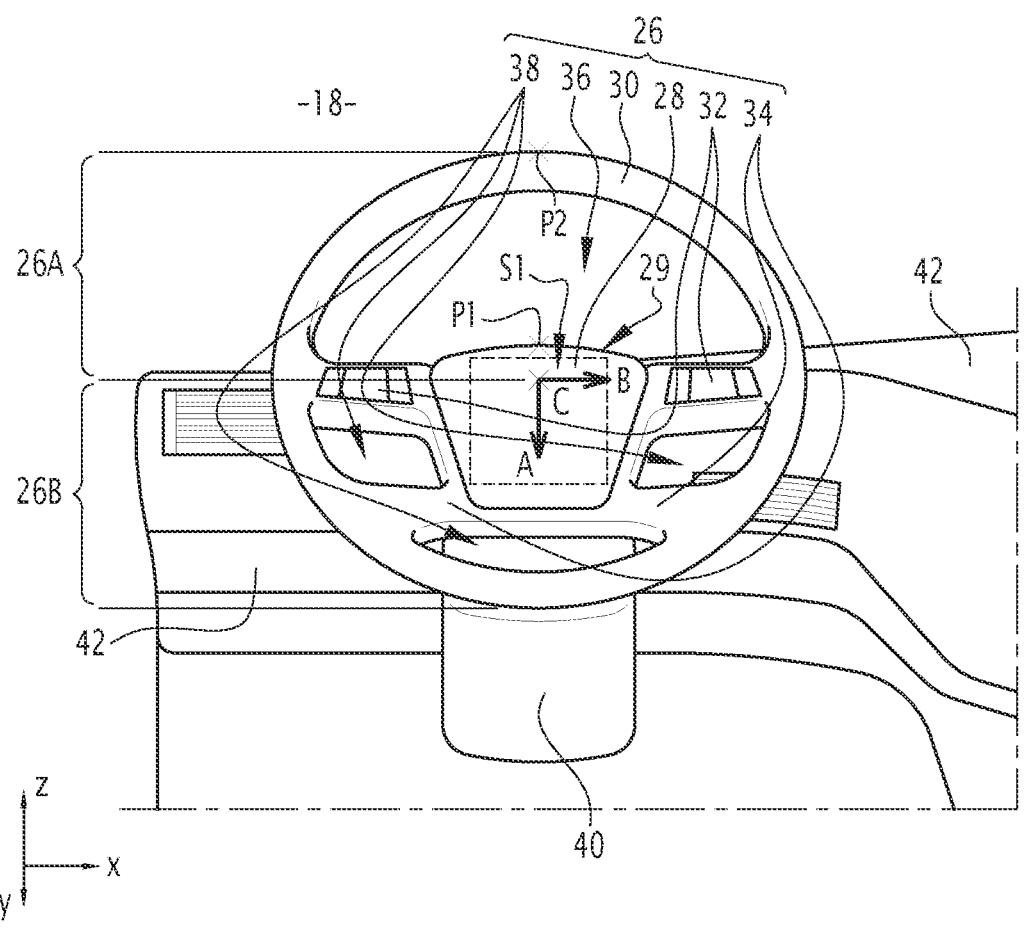
FIG. 2 is a partial perspective view of the inside of the truck cabin of FIG. 1, viewed from a driver's perspective, with a steering wheel having a first steering angle.
Figure 3:
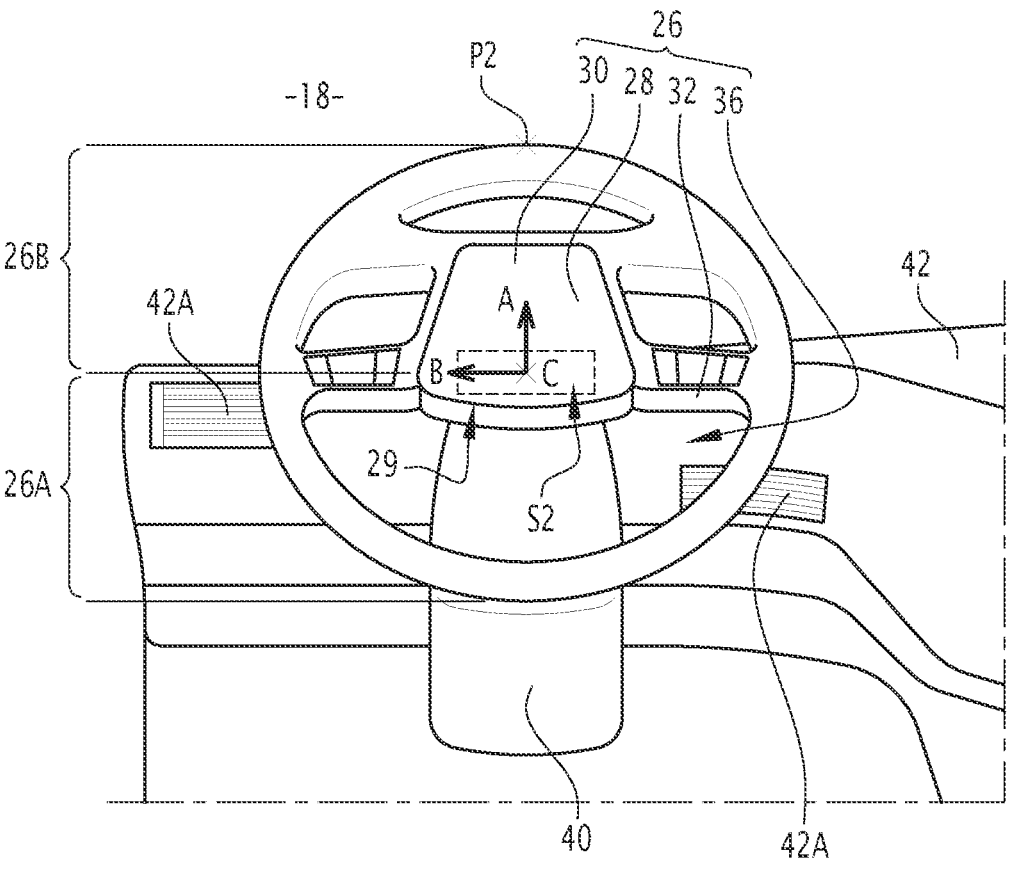
FIG. 3 is a partial perspective view similar to FIG. 2, with the steering wheel in a second steering angle.

FIGS. 2 and 3 are viewed from the perspective of the driver 48 seated in the driver's seat 20.

The truck cabin 10 also comprises a steering wheel 26, which is best seen in FIGS. 2 and 3. The steering wheel is rotatably mounted onto a steering column 40 of the truck cabin in such a way that a rotation of the steering wheel causes a rotation of non-represented wheels of the truck. A central point of the steering wheel is noted C. An axis of rotation of the steering wheel, non-represented, passes through the central point C. In other words, the steering wheel 26 is rotatable around the central point C in a plane P26 perpendicular to the axis of rotation of the steering wheel. A height axis A and a width axis B are defined relative to the steering wheel 26 as corresponding to two main axis of the steering wheel, centered onto the central point C and belonging to the plane P26. The steering wheel essentially extends in the plane P26.

When the steering wheel 26 is not turned, that is, when a steering angle of the steering wheel is equal to 0°, as represented on FIG. 2, the height axis A is perpendicular to the transversal axis Y and oriented towards the rear wall 16, whereas the width axis B is parallel to the transversal axis Y and oriented to the right. When the steering angle of the steering wheel is equal to 180°, as represented on FIG. 3, the height axis A is perpendicular to the transversal axis Y and oriented towards the windshield 18, whereas the width axis B is parallel to the transversal axis Y and oriented to the left. In practice, independently of the steering angle of the steering wheel 26, the plane P26 formed by the axis A and B is parallel to the transversal axis Y.

In the example, the height axis A is an axis of symmetry of the steering wheel 26. In the example, the width axis B separates the steering wheel 26 into an upper half 26A and a lower half 26B.

The steering wheel 26 comprises a central part 28, an outer ring 30 and spokes to connect the central part to the outer ring.

The center part 28 straddles both the upper and lower halves 26A, 26B of the steering wheel 26, and, in the example, is predominantly located in the lower half of the steering wheel.

In the exemplary embodiment, the steering wheel 26 comprises two upper spokes 32 and two lower spokes 34, with the two upper spokes 32 located between the upper half 26A and the lower half 26B of the steering when, and the two lower spokes 34 located in the lower half 26B of the steering wheel.

As a variant, not shown, the upper spokes 32 and lower spokes 34 are arranged differently. As a variant, not shown, the steering wheel comprises a different number of spokes, for example, two spokes, corresponding to the upper spokes or to the lower spokes, or three spokes, with two upper spokes and one lower spoke. Other configurations can be considered.

The steering wheel comprises an upper opening 36, which is delimited by the central part 28, the outer ring 30 and the two upper spokes 32. The upper opening 36 is located, at least partially, in the upper half 26A of the steering wheel 26. In the example, the upper opening 36 is completely located in the upper half of the steering wheel.

As a variant, not shown, the steering wheel comprises a different number of upper openings 36, depending of the number of spokes of the steering wheel, for example two upper openings.

The steering wheel comprises three lower openings 38, which are delimited, for two of them, by the central part 28, the outer ring 30 one upper spoke 32 and one lower spoke 34, and for the third one, by the central part 28, the outer ring 30 and the two lower spokes 34. The lower openings 38 are located, at least partially, in the lower half 26B of the steering wheel 26. In the example, the lower openings 38 are completely located in the lower half of the steering wheel.

As a variant, not shown, the steering wheel comprises a different number of lower openings 38, depending of the number of spokes of the steering wheel.

The truck cabin 10 comprises a dashboard 42, extending alongside the transversal axis Y. The dashboard 42 is located, along the longitudinal axis X, between the windshield 18 and the steering wheel 26, and, along the vertical axis Z, between the floor 12 and the steering wheel 26.

Preferably, the dashboard 42 comprises air conditioning grids 42A, controls of the truck, not shown, such as, for example, air conditioning control or cruise control, and/or security systems, not shown, such as, for example, airbags.

The truck cabin 10 comprises a projector 44, which is preferably mounted to the roof 14, for example with a projector mount 46 connecting the projector to the roof. The projector 44 is aligned with the steering wheel 26, along the transversal axis Y. Preferably, the projector 44 is located above the driver's seat 20. The projector 44 is an optical device that projects an image or images onto the steering wheel 26, which is therefore acting as a projection screen. The projector 44 is a digital video projector, using, for example lasers or LEDs to project the image. The projection cone C44 of the projector 44 is shown in dotted line in FIG. 1. Projector 44 position could be manually adjusted to ensure that projected image fit with steering wheel 26. Adjustment could be automatically setting according to steering wheel 26 angle and driver position.

The image projected by the projector 44 onto the steering wheel 26 comprises information about the operation of the truck, such as, for example and in a non-limitative way, truck speed, fuel gauge, rotational speed of the motor and/or motor temperature. By being projected directly onto the steering wheel, the information about the operation of the truck is easily readable by the driver 48.

In practice, the image projected by the projector 44 is projected on the central part 28 of the steering wheel 26. When the steering angle is equal to 0°, as visible on FIG. 2, the image projected by the projector 44 is projected in a first area S1 of the steering wheel 26, this area being defined on the central part 28. When the steering angle is equal to 180°, as visible on FIG. 3, the image projected by the projector 44 is projected in a second area S2 of the steering wheel 26, which is different from the first area S1 but still defined on the central part 28.

In the example, the image projected by the projector 44 is stationary, in the plane P26 of the steering wheel 26. The projection cone C44 is configured so that the first area S1 occupies a maximum surface of the central part 28. In other words, the projector is configured to project the largest possible image when the steering angle is equal to 0°, i.e., the first area S1 covers the largest possible portion of the central part 28 of the steering wheel. Therefore, the image projected by the projector 44 is predominantly located in the lower half 26B of the steering wheel 26, when the steering angle is equal to 0°.

Since the central part 28 of the steering wheel 26 is rotated around its axis of rotation passing through the central point C of 180° when the steering angle is equal to 180°, as visible on FIG. 3, the second area S2 corresponds to a fraction of the first area S1. In practice, the second area S2 corresponds to the fraction of the central part 28 intersecting with the first area S1 when the steering angle is equal to 180°.

Since the second area S2 is only a fraction of the first area S1, the image projected onto the second area S2 is smaller than the image projected onto the first area S1. To accommodate for this smaller image, the image projected onto the second area S2 comprises less information about the operation of the truck than the image projected onto the first area S2, and/or the information displayed in the image projected onto the second area are of a smaller size than the information displayed in the image projected onto the first area.

In the example, the first area S1 has a surface comprised between 14000 and 18000 mm$^2$, preferably equal to 16000 mm$^2$, and the second area S2 has a surface comprised between 4000 and 8000 mm$^2$, preferably equal to 6000 mm$^2$.

In an alternative embodiment of the invention, not shown, the image projected by the projector 44 is mobile, in the plane P26 of the steering wheel, and the projector 44 is configured to maintain a constant surface area of the projection zone when the steering wheel is rotated around the central point C. In particular, in this alternative embodiment, the image projected by the projector onto the steering wheel is rotated around the central point C along with the steering wheel. To maintain a good readability by the driver 48 of the information displayed onto the steering wheel, the various displayed information can be rearranged inside of the projected image during the rotation of the steering wheel, with their orientation remaining identical.

Since the information about the operation of the truck is projected by the projector 44 onto the steering wheel 26, there is no need for the dashboard 42 to include ordinary information displays providing this information, such as gauges and/or a digital screen. In comparison with an ordinary truck cabin, the dashboard 42 is therefore lowered, along the vertical axis Z, at the level of the steering wheel 26 along the transversal axis Y. In other words, at the level of the steering wheel 26 along the transversal axis Y, the dashboard 42 does not comprises any information displays about the operation of the truck.

A first direction of sight, or line of sight, of the driver 48 is noted L1 and is visible on FIG. 1. The first direction of sight L1 corresponds to the direction of sight of the driver 48 when the driver is sitting in the driver's seat 20 and looking at the steering wheel 26, and more particularly at an edge 29 between the central part 28 and the upper opening 36. The first direction of sight L1 intersects the windshield 18 on a first intersection point noted P1, which corresponds to the lowest visible point of the windshield through the upper opening 36, when the steering angle is equal to 0°. The first intersection point P1 is visible on FIGS. 1 and 2. When the steering angle is equal to 180°, as visible on FIG. 3, the first intersection point P1 is hidden by the central part 28 of the steering wheel 26.

A second direction of sight, or line of sight, of the driver 48 is noted L2 and is visible on FIG. 1. The second direction of sight L2 corresponds to the direction of sight of the driver 48 when the driver is sitting in the driver's seat 20 and looking above the steering wheel 26, and more particularly right above the outer ring 30 of the steering wheel. The second direction of sight L2 intersects the windshield 18 on a second intersection point noted P2, which corresponds to the lowest visible point of the windshield above the steering wheel 26. The second intersection point P2 is visible on FIGS. 1, 2 and 3.

The first and second directions of sight L1 and L2 are, in practice, perpendicular to the transversal axis Y.

Along the vertical axis Z, the first intersection point P1 is located above the base 22 of the driver's seat 20 at a height H1 which is less than or equal to 60 mm. In the example, the height H1 is equal to 50 mm.

Along the vertical axis Z, the second intersection point P2 is located above the base 22 of the driver's seat 20 at a height H2 which is less than or equal to 400 mm. In the example, the height H2 is equal to 350 mm.

Thus, in the example, the first and second intersection points P1 and P2 are separated, along the vertical axis Z, by a vertical distance or height H3, which is greater than or equal to 250 mm. In the example, the height H3 is equal to 300 mm.

When the driver's seat 20 is adjustable in height, the heights H1 and H2 are measured when the driver's seat is raised to the maximum.

The truck cabin 10 does not comprises any information displays about the operation of the truck, other than the image projected by the projector 44, at least in the first direction of sight L1 and preferably in the second direction of sight L2. In particular, the dashboard does not comprise any information displays about the operation of the truck. In other words, from the driver 48 perspective, the truck cabin comprises no information display behind and above the steering wheel 26. In other words, the cabin 10 has no screen in the direction L1, and preferably in the direction L2. This is particularly beneficial, since this allows for the driver 48 to see the windshield 18 through the upper opening 36, and in particular down to the first intersection point P1, instead of seeing a dashboard with information displays as it is the case in the usual truck cabins. Indeed, in the usual truck cabins, the lowest visible point of the windshield is located in the line of sight of the driver when the driver is looking above the steering wheel, i.e., in the usual truck cabins, the lowest visible point corresponds roughly to the present second intersection point P2.

Therefore, thanks to the invention, the lowest visible point of the windshield 18, from the driver 48 perspective, is lowered by the height H3, along the vertical axis Z, as compared to the lowest visible point of the windshield of usual truck cabins. The visibility of the driver 48 in front of the truck cabin 10 is therefore increased, by diminishing the blind spot caused by the dashboard 42, thus reducing the risk of accidental collision of the truck with objects located in front of the truck cabin 10.

As a variant of the invention, not shown, the image projected by the projector 44 is also projected onto the upper spokes 32 and/or onto the lower spokes 34 of the steering wheel 26.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. A truck cabin for a truck, comprising a windshield, a driver's seat, a steering wheel, a dashboard, and a projector projecting an image onto the steering wheel, wherein:

the projector is configured to adapt the image projected onto the steering wheel depending on a steering angle of the steering wheel;

the image projected by the projector onto the steering wheel is configured to comprise information about operation of the truck; and in a first direction of sight of a driver sitting in the driver's seat and looking at the steering wheel, the dashboard does not comprise any other information displays about the operation of the truck.

2. The truck cabin of claim 1, wherein in a second direction of sight of the driver sitting in the driver's seat and looking above the steering wheel, the dashboard does not comprise any other information displays about the operation of the truck.

3. The truck cabin of claim 2, wherein in the second direction of sight, the dashboard is not visible.

4. The truck cabin of claim 1:

wherein the driver's seat comprises a base and a backrest; and wherein a height measured along a vertical axis of the truck cabin between the base and a lowest visible point of the windshield, in the first direction of sight, is less than or equal to 60 mm.

5. The truck cabin of claim 1, wherein a height measured along a vertical axis of the truck cabin between a lowest visible point of the windshield, in the first direction of sight, and a lowest visible point of the windshield, in a second direction of sight of a driver sitting in the driver's seat and looking above the steering wheel, is greater than or equal to 250 mm.

6. The truck cabin of claim 1:

wherein the steering wheel comprises a central part on which the image is projected by the projector, an outer ring, spokes connecting the central part to the outer ring, and an upper opening delimited by the central part, the outer ring, and two spokes, the upper opening being located on an upper half of the steering wheel; and wherein, in the first direction of sight, when a steering angle of the steering wheel is equal to 0°, the windshield is visible through the upper opening.

7. The truck cabin of claim 6, wherein in the first direction of sight, the dashboard is not visible through the upper opening.

8. The truck cabin of claim 1:

wherein, when the steering angle is equal to 0°, the projector projects the image on a first area of the steering wheel;

wherein, when the steering angle is equal to 180°, the projector projects the image on a second area of the steering wheel; and wherein the second area is a portion of the first area.

9. The truck cabin of claim 1, wherein the projector is mounted on a roof of the truck cabin.

10. The truck cabin of claim 1, wherein the information about the operation of the truck projected by the projector onto the steering wheel is selected from a set of information including truck speed, fuel gauge, rotational speed of a motor, and/or motor temperature.

\* \* \* \* \*